US011060949B2

(12) United States Patent
Huot et al.

(10) Patent No.: US 11,060,949 B2
(45) Date of Patent: Jul. 13, 2021

(54) SYSTEMS AND METHODS FOR MODAL TESTING OF TURBINE BLADES

(71) Applicant: Chromalloy Gas Turbine LLC, Palm Beach Gardens, FL (US)

(72) Inventors: Brian Huot, Stuart, FL (US); James Page Strohl, Stuart, FL (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 197 days.

(21) Appl. No.: 16/458,475

(22) Filed: Jul. 1, 2019

(65) Prior Publication Data

US 2020/0003654 A1 Jan. 2, 2020

Related U.S. Application Data

(60) Provisional application No. 62/693,135, filed on Jul. 2, 2018.

(51) Int. Cl.
*G01M 7/02* (2006.01)
*G01M 13/00* (2019.01)
*G01M 7/06* (2006.01)

(52) U.S. Cl.
CPC ............ *G01M 7/027* (2013.01); *G01M 7/025* (2013.01); *G01M 7/06* (2013.01); *G01M 13/00* (2013.01)

(58) Field of Classification Search
CPC ........ G01M 7/025; G01M 7/027; G01M 7/06; G01M 13/00
See application file for complete search history.

(56) References Cited

U.S. PATENT DOCUMENTS

| | | | | |
|---|---|---|---|---|
| 3,818,646 A * | 6/1974 | Peterson | B23Q 3/063 | 451/365 |
| 4,422,334 A * | 12/1983 | Yasuda | B06B 1/10 | 403/57 |
| 5,445,030 A * | 8/1995 | Hagen | G01M 7/06 | 73/662 |
| 5,544,873 A * | 8/1996 | Vickers | B23B 1/00 | 269/47 |
| 6,820,468 B2 * | 11/2004 | Powers | F01D 25/285 | 73/432.1 |
| 8,479,586 B2 * | 7/2013 | Miyakozawa | G01N 3/32 | 73/778 |
| 8,650,956 B2 * | 2/2014 | Smith | G01M 7/027 | 73/577 |
| 2012/0042730 A1 * | 2/2012 | Johnson | G01M 7/027 | 73/579 |
| 2016/0047707 A1 * | 2/2016 | Lee | B06B 3/00 | 73/577 |
| 2018/0003591 A1 * | 1/2018 | Renegar | G01M 7/027 | |
| 2018/0080845 A1 * | 3/2018 | Dominique | G01M 1/00 | |

* cited by examiner

*Primary Examiner* — Natalie Huls
(74) *Attorney, Agent, or Firm* — Avant Law Group, LLC

(57) ABSTRACT

Systems and methods for modal testing of blades. A method for modal testing of a blade comprises providing a generally spherical fixture for retaining the blade in a fixed-free configuration. The method includes using an excitation device for exciting the blade while the blade is retained within a blade retaining portion of the fixture. The method comprises using a measurement device to measure a response of the blade to the excitation. The fixture includes an attachment portion configured for the securement of the excitation device to the fixture.

20 Claims, 4 Drawing Sheets

104
402
410
404
302
306
408
A
406

SYSTEMS AND METHODS FOR MODAL TESTING OF TURBINE BLADES

CROSS-REFERENCE TO RELATED APPLICATIONS

This application claims priority to U.S. Provisional Patent Application, No. 62/693,135 filed Jul. 2, 2018 and titled "Systems and Methods for Modal Testing of Turbine Blades." The disclosure of this application is incorporated by reference herein in its entirety.

FIELD OF THE DISCLOSURE

The disclosure relates generally to the field of modal testing. More specifically, the disclosure relates to systems and methods for comparative modal testing of turbine blades.

SUMMARY

In an embodiment, a system for modal testing of a blade comprises a fixture for retaining the blade in a fixed-free configuration. The fixture has a body. The body is generally spherical and comprises a blade retaining portion, a flat fixture locating portion, and at least one attachment portion. The blade retaining portion includes a slot, a set screw, and a pusher plate. The at least one attachment portion has an opening. The system comprises an excitation device for exciting the blade retained in the fixture, and a measurement device to measure a response of the blade to the excitation. The system includes an evaluation device to evaluate the measurement.

In another embodiment, a method for modal testing of a blade comprises providing a generally spherical fixture for retaining the blade in a fixed-free configuration. The method includes using an excitation device for exciting the blade while the blade is retained within a blade retaining portion of the fixture. The method comprises using a measurement device to measure a response of the blade to the excitation. The fixture includes an attachment portion configured for the securement of the excitation device to the fixture.

In yet another embodiment, a fixture usable to retain a blade in a fixed-free configuration for modal testing comprises a body. The body is generally spherical and has a blade retaining portion and an attachment portion. The blade retaining portion includes a set screw and a pusher plate. The attachment portion has a flat surface and an opening that extends away from the flat surface. The attachment portion is configured for the attachment of an excitation device.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Figure 1:
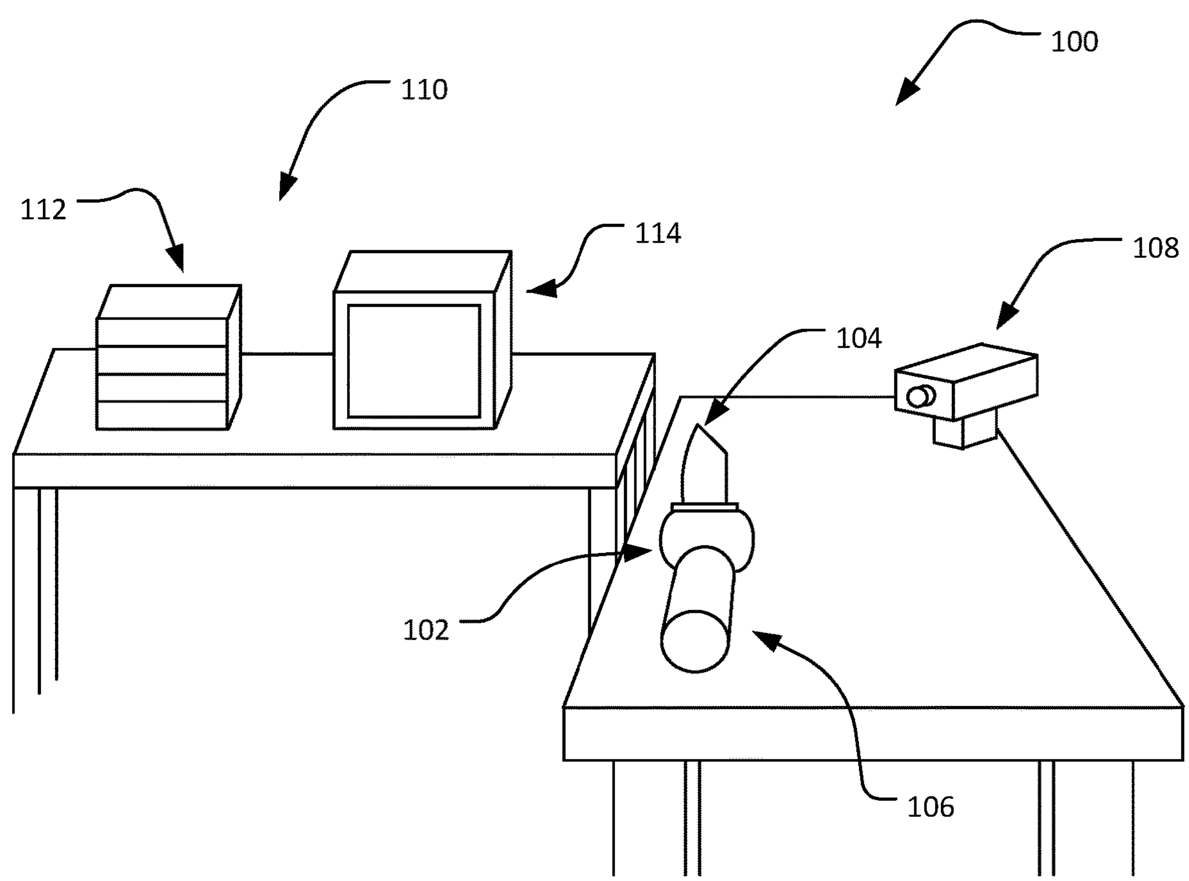
FIG. 1 shows a system for modal testing of turbine blades.

The Federal Aviation Administration ("FAA") allows for the manufacture of replacement parts for use in aircraft so long as the parts are manufactured in accordance with FAA approved procedures and meet FAA standards for airworthiness. The FAA's approval for the parts, referred to as PMA (Parts Manufacturer Approval), is an approval given to a manufacturer for a replacement part confirming that the replacement part will operate substantially similar to the part of the original equipment manufacturer ("OEM"). When the proposed replacement part is a blade of a turbine engine, the PMA applicant must show, among other things, that the vibratory stresses (which result from the engine internal excitation forces (i.e., gas path, mechanical component, or other dynamic interactions)) of the original blade and the proposed blade are equivalent. The blade vibratory stresses of the original blade and the proposed blade are expected to be equivalent when the modal characteristics (i.e., natural frequencies and mode shapes) and the damping characteristics thereof are equivalent and the blades have comparable geometry, mass, and material characteristics.

A PMA applicant conducts a comparative modal evaluation of the original blade and the proposed blade to show equivalency of the blades' natural frequencies and mode shapes. The natural frequencies of the original blade and the PMA blade are considered by the FAA to be equivalent where the PMA blade frequency scatter band for each mode is equal to or less than the scatter band of the original parts. The mode shapes of the PMA blade and the original blade are considered by the FAA to be equivalent for each mode when they are quantitatively shown to be similar, using, e.g., the Modal Assurance Criteria (MAC) known to the artisan or comparable means.

The comparative modal evaluation of the original blade and the proposed blade typically involves both numerical simulations (e.g., a finite element analysis (FEA)) and laboratory testing. The FEA may be conducted prior to the laboratory testing. The FEA may allow the PMA applicant to identify the expected natural frequencies and mode shapes, so as to ensure that the laboratory testing will cover all the natural frequencies within the flight envelope and a given range of rotational speeds (e.g., from zero rpm to 105% of the maximum physical rotational speed permitted for at least two minutes, or from zero rpm to 102% of any other permitted speed). The FEA may further allow the PMA applicant to verify that the test data is not corrupted by modal interaction with the apparatus used in the laboratory testing, e.g., with a fixture thereof, as discussed herein. The artisan understands that the modal testing of the blades may be conducted at least in part in a "fixed-free" configuration. In the fixed-free configuration, at least a part of the blade (e.g., the blade attachment) is fixed in a fixture and at least a part of the blade (e.g., the airfoil thereof) is free. The comparative modal testing may involve excitation of the original and the proposed blades, measurement of the blades' response to the excitation, and a comparison of these measurements.

The laboratory test equipment may include a fixture to retain the blade in the fixed-free configuration, an excitation device to excite the blade while a portion thereof is retained within the fixture, a measurement device to measure the response of the blade to the excitation, and an evaluation device to evaluate the response of the OEM blade and PMA blade and allow for a comparison thereof.

The fixture used to retain the blade in the fixed-free configuration is typically made of metal or metal alloys, and care is taken to ensure that the mass of the fixture substantially exceeds the mass of the blade being tested (e.g., is fifty times the mass of the blade) such that the fixture approximates a fixed root condition. The artisan will understand that significant movement of the fixture upon excitation of the blade (i.e., movement of the fixture together with the blade upon excitation) may preclude an accurate determination of the natural frequencies of the blade alone.

frequencies of the blade are the same as or close to the natural frequencies of the fixture. It may therefore be desirable to use in the modal testing a fixture whose natural frequencies are sufficiently spaced apart from the natural frequencies of the blade. Natural frequencies of the generally spherical fixture disclosed herein are markedly greater than the natural frequencies of a prior art rectangular fixture of the same composition and mass, and in embodiments, are greater than the test frequencies. A comparison of these frequencies for a spherical fixture and a rectangular fixture of the same general composition and mass is shown below.

TABLE 1

Comparison of natural frequencies of square and spherical fixtures

| Mode | Round Fixture Freq. | Round Mode Shape | Square Fixture Freq. | Square Mode Shape |
|---|---|---|---|---|
| 1 | 390.836 | 1$^{st}$ Bending | 369.203 | 1$^{st}$ Bending |
| 2 | 809.141 | Stiffwise | 826.616 | Stiffwise |
| 3 | 2034.66 | 2$^{nd}$ Bending | 2036.53 | 2$^{nd}$ Bending |
| 4 | 2221.94 | 1$^{st}$ Torsion | 2228.59 | 1$^{st}$ Torsion |
| 5 | 4403.99 | 2$^{nd}$ Stiffwise | 4389.87 | 2$^{nd}$ Stiffwise |
| 6 | 5239.05 | 3$^{rd}$ Bending | 4897.38 | Fixture and Blade |
| 7 | 6750.49 | 2$^{nd}$ Torsion | 4983.51 | Fixture and Blade |
| 8 | 8169.88 | 4$^{th}$ Bending | 5403.87 | 3$^{rd}$ Bending |
| 9 | 8466.86 | Pogo | 6535.18 | Fixture and Blade |
| 10 | 9320.26 | 3$^{rd}$ Torsion | 6821.41 | 2$^{nd}$ Torsion |
| 11 | 11001.2 | Leading Edge Platform Bending | 8226.52 | 4$^{th}$ Bending |
| 12 | 11189.1 | High Order Blade Mode | 8509.87 | Pogo |
| 13 | 11722.1 | 5$^{th}$ Bending | 9082.04 | Fixture and Blade |
| 14 | 13141.3 | High Order Blade Mode | 9493.33 | 3$^{rd}$ Torsion |
| 15 | 14545.7 | High Order Blade Mode | 10655.5 | Leading Edge Platform Bending |

The excitation device may comprise a shaker, an acoustic horn, or other such excitation means usable to provide controlled and repeatable inputs. Impact hammers may also be used for larger components. However, impact hammers require human input and may thus not be highly controllable or repeatable. The measurement device may be a force gage, a laser displacement measurement device, an accelerometer, a microphone for measuring sound radiations from the blade, or one or more other such devices. The evaluation device may comprise a signal analyzer and a computing device having appropriate software to compare and evaluate the responses of the original and the proposed blades.

In the prior art, the fixture used to retain the blade in the fixed-free configuration is typically in the shape a rectangle (e.g., a square). This is in part because a rectangular fixture is relatively easy to design and manufacture. Rectangular fixtures are also relatively easy to locate, e.g., on a laboratory bench or elsewhere, because of their smooth surfaces, thus ensuring contact between the fixture and the bench. For these and other such reasons, the aerospace industry has been using rectangular fixtures for modal testing of blades for many decades.

Applicant discovered that this long-standing practice of using such rectangular fixtures for fixed-free modal testing of blades is suboptimal. Specifically, a rectangular fixture, albeit easy to manufacture and locate, is prone to interfere with the modal testing of the blade retained thereby. More specifically, the natural frequencies of a rectangular fixture are relatively low (as compared to a generally spherical fixture of the same composition and mass, for example), and these natural frequencies of the rectangular fixture may interfere with the modal testing of the blade if the natural Increasing the natural frequencies of the fixture by using a generally spherically fixture instead of a rectangular fixture may minimize fixture and blade interaction during the modal test and thereby increase the accuracy with which the natural frequencies of the blade are determined.

FIG. 1 shows an example apparatus (or system) 100 for modal testing of blades, according to an embodiment of the present disclosure. The testing apparatus 100 includes a fixture 102 for retaining a blade 104 being tested in a fixed-free configuration, an excitation device 106 to excite the blade being tested, a measurement device 108 for measuring the response of the blade 104 to the excitation, an evaluation device 110 (i.e., a signal analyzer 112 coupled to a computing system 114 loaded with appropriate software) to evaluate the measured response, and a force gage (situated between the excitation device 106 and the fixture 102 (not clearly visible in this figure)) to measure the input force being applied. In an embodiment, the excitation device 106 may be the Etrema PP12107250 high frequency shaker, the measurement device 108 may comprise one or more Polytec laser Doppler vibrometers, the signal analyzer 112 may be a Data Physics mobilyzer, the computing system 114 may include software solutions by Autopower, Crosspower, etc., and the force gage may be a PCB Force Sensor (208C02). Of course, in embodiments, the apparatus 100 may alternately or in addition include other suitable devices that can accomplish the purpose of the present invention. The final calculations measured may be a Frequency Response Function (FRF).

Figure 2:
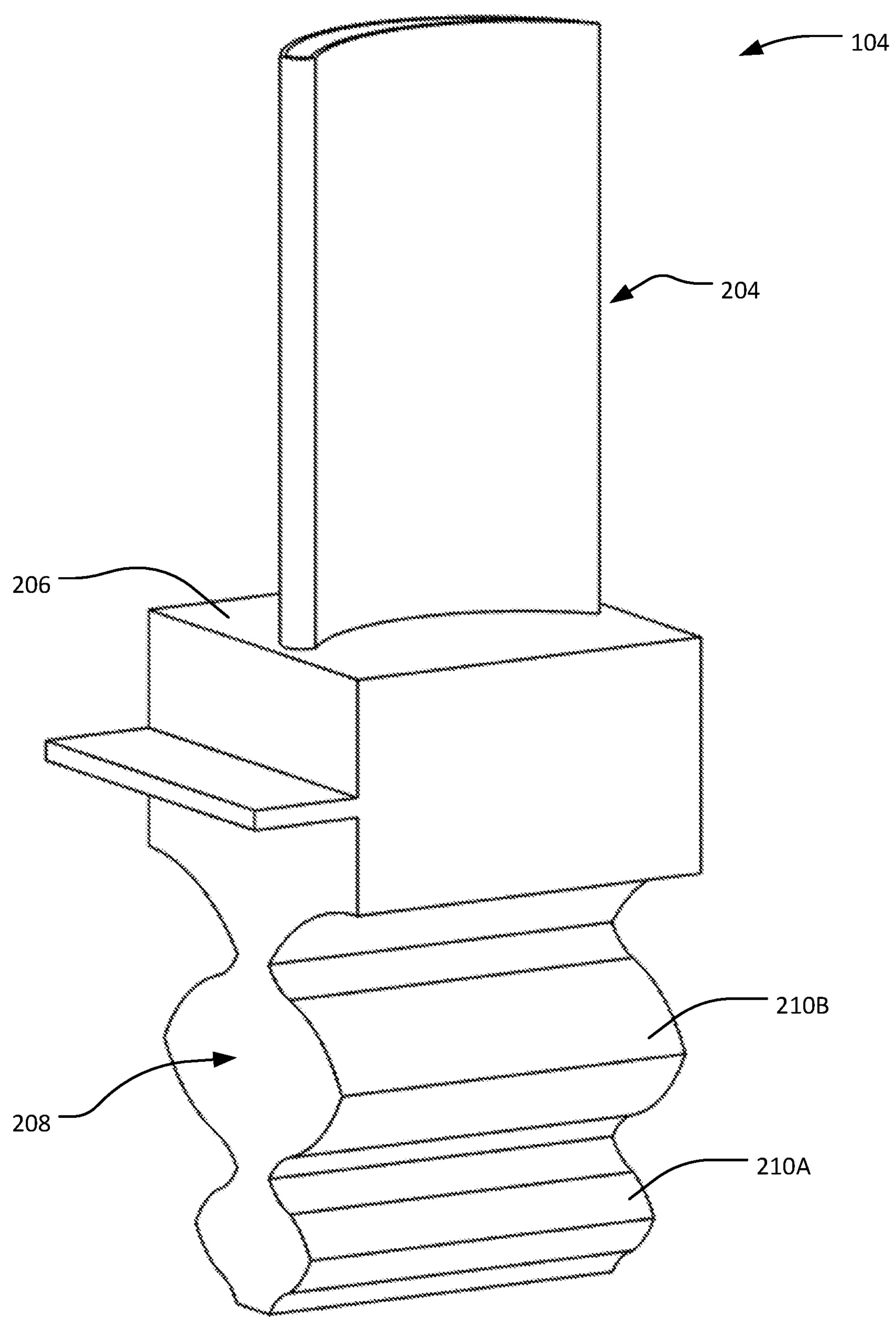
FIG. 2 shows a perspective view of a turbine blade to be tested in the system of FIG. 1.

FIG. 2 shows the blade 104 being tested using the testing apparatus 100 in FIG. 1 in additional detail (e.g., a PMA blade). The blade 104 may have an airfoil 204, a platform 206, and a fir tree root 208 having a plurality of teeth, such as teeth 210A and 210B. In operation, the teeth 210A and 210B of the fir tree root 208 may mate with capturing featuring provided on the turbine disk to allow the blade 104 to be rotatably coupled thereto. The artisan will understand from the disclosure herein that the blade 104 is merely exemplary, is not intended to be independently limiting, and that other turbine blades may likewise be tested using the apparatus 100.

Figure 3:
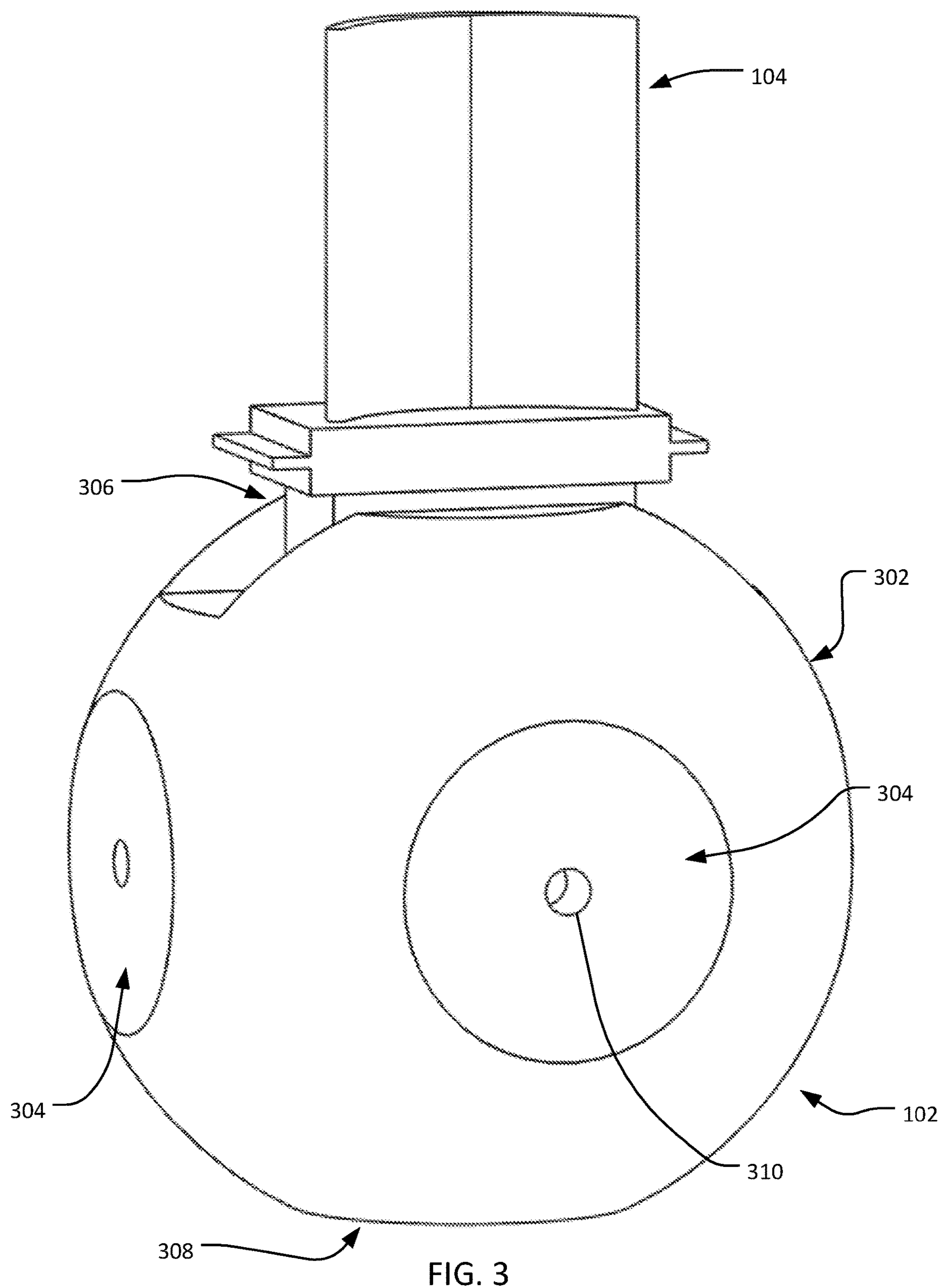
FIG. 3 shows a perspective view of a fixture of the system of FIG. 1 for retaining the blade of FIG. 2 for testing.

FIG. 3 shows the fixture 102 after the blade 104 has been secured thereto in the fixed-free mode. As can be seen, the fixture 102 may be generally spherical (e.g., may be frusto-spherical). More specifically, the fixture 102 may have a generally spherical body 302, a plurality of attachment surfaces 304 each configured for the attachment of the shaker 106, a blade retaining portion 306 for retaining a portion of the blade 104 for modal testing, and a flat attachment or fixture locating portion 308 for locating the fixture 102 during the testing process.

In an embodiment, the fixture 102 may include four attachment surfaces 304 spaced equidistantly around an outer surface of the fixture 102. These attachment surfaces 304 may be generally perpendicular to each other and the fixture locating portion 308. In an alternate embodiment, though, a different number of attachment surfaces may likewise be provided. Each attachment surface 304 may be generally flat, and may, in embodiments, be formed by cutting off a portion of the body 302 (e.g., with a wire or the like). Each attachment surface 304 may include an opening 310 that extends away from the attachment surface into a portion of the body 302. The opening 310 may be configured to receive the shaker 106. For example, the shaker 106 may have a threaded male end, and an interior portion of the fixture 102 defining the opening 310 may have corresponding threading to allow the shaker 106 to be operably coupled to the fixture 102 for excitation of the blade 104.

In embodiments, the force gage may be situated between the shaker 106 and the fixture 102. The fixture 102, the shaker 106, and the force gage may have threads (e.g., female threads) and may be held together using set screws or other retention mechanisms. In embodiments, a "stinger" (i.e., a thin rod of metal intended to decouple off-axis vibrations) may also be provided.

The fixture locating portion 308 may, in embodiments, oppose the blade retaining portion 306 and be generally flat. The fixture retaining portion 308 may allow for the fixture 102 to be stably located on a laboratory bench or elsewhere for testing.

Figure 4:
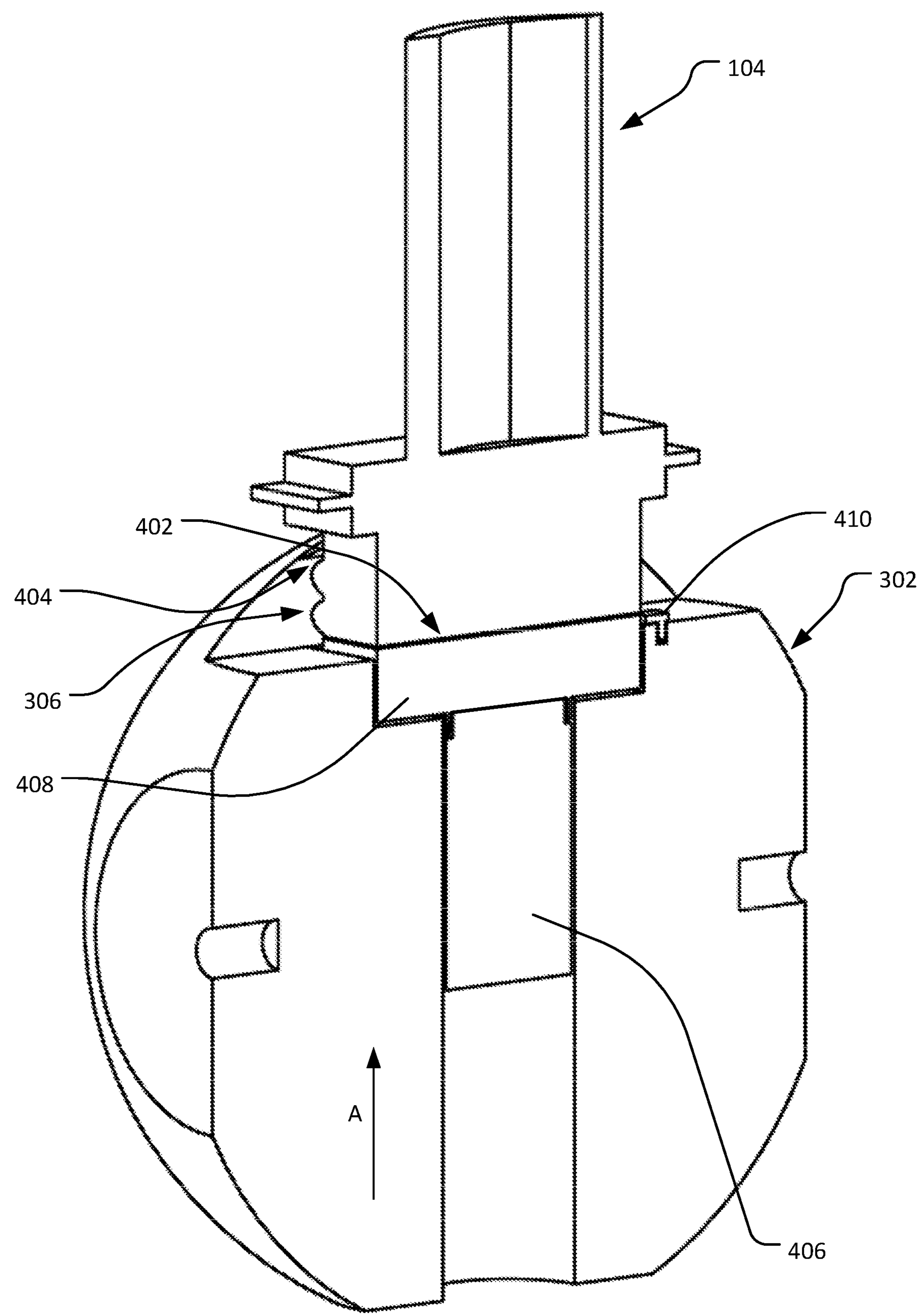
FIG. 4 shows a sectional view of the fixture of FIG. 3.

Focus is directed now to FIG. 4, which shows the blade retaining portion 306 in cross section. The blade retaining portion 306 may include a slot 402 that extends into the body 302. The interior portion of the fixture 102 defining the slot 402 may include capturing features 404 configured to mate with the blade root 208, including the teeth 210A and 210B thereof. The blade retaining portion 306 may also include a set screw 406, a pusher plate 408, and a stop 410. In embodiments, the pusher plate 408 may be a part of the stop 410. Prior to the modal testing, the blade root 208 may be disposed within the fixture slot 402 and the set screw 406 may be rotated via a torque wrench or other means. The set screw 406 may push the pusher plate 408 upwards in a direction A, which may resultantly push the blade root 208 in the direction A into the capturing features 404. The blade retaining portion 306 may retain the blade 104 such that the bottom of the fir tree root 208 (see FIG. 2) and the top tooth of the fir tree (i.e., tooth 210B in the illustrated embodiment) are restrained. The fixture 102 may be configured such that no portion of the fixture 102 or other instrumentation contacts the blade 104 retained within the fixture 102 at or above the platform 206. Thus, the blade retaining portion 306 may allow for the blade 104 to be retained for modal testing in the fixed-free position in much the same way the blade 104 would be coupled to the turbine disk during normal operation, where the blade is under centrifugal forces due to rotation.

To conduct the modal testing using the apparatus 100, the blade root 208 may be secured within the fixture slot 402 via the blade retaining portion 306 of the fixture 102 as discussed herein. When so securing the blade 104, the set screw torque may be determined so as to ensure repeatability of the test. The shaker 106 may be operably coupled to one of the attachment surfaces 304 and may be used to excite the blade 104. The response of the blade 104 to the excitation may be measured using the laser vibrometers 108, and the measurements may be evaluated via the signal analyzer 112 and computing system 114. The test results may be stored, and the test may be repeated for other blades to allow for a comparative modal evaluation of the proposed blade and the original blade.

While the figures show a fixture 102 having a particular configuration, the artisan will understand that such is merely exemplary and that different generally spherical fixtures having varying natural frequencies may be designed for the testing of other blades. The term blade, as used herein, comprises a blade or vane of a turbine engine, compressor, or an auxiliary power unit. The fixture 102, disclosed herein as being usable to test for natural frequencies of blades (e.g., gas turbine and compressor blades), may also be used in other high frequency applications requiring a pseudo-fixed boundary condition.

Thus, as has been described, the generally spherical fixture 102, because of its comparatively higher natural frequencies, may minimize the interference between fixture modes and blade modes during fixed-free testing relative to the prior art rectangular fixtures, and thereby, significantly improve the process via which the comparative modal evaluation of blades is effectuated.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations. Not all steps listed in the various figures need be carried out in the specific order described.

The disclosure claimed is:

1. A system for modal testing of a blade, comprising:

a fixture for retaining said blade in a fixed-free configuration; said fixture having a body; said body being generally spherical and comprising a blade retaining portion, a flat fixture locating portion, and at least one attachment portion; said blade retaining portion including a slot, a set screw, and a pusher plate; said at least one attachment portion having an opening;

an excitation device for exciting said blade retained in said fixture;

a measurement device to measure a response of said blade to said excitation; and an evaluation device to evaluate said measurement.

2. The system of claim 1, wherein said opening is configured to allow said excitation device to be secured to said fixture.

3. The system of claim 2, wherein said excitation device is attached to said at least one attachment portion of said fixture and said at least one attachment portion is generally perpendicular to said flat fixture locating portion.

4. The system of claim 2, wherein said blade retaining portion includes a stop.

5. The system of claim 2, wherein said slot includes capturing features configured to mate with a root of a blade.

6. The system of claim 5, wherein said pusher plate and set screw are usable to push said blade root into said capturing features.

7. The system of claim 1, wherein said at least one attachment portion includes four attachment portions.

8. The system of claim 1, wherein said excitation device is a frequency shaker.

9. The system of claim 1, wherein said measurement device comprises a laser vibrometer.

10. A method for modal testing of a gas turbine blade, comprising:

providing a generally spherical fixture for retaining said blade in a fixed-free configuration;

using an excitation device for exciting said blade while said blade is retained in a blade retaining portion of said fixture; and using a measurement device to measure a response of said blade to said excitation;

wherein, said fixture includes an attachment portion configured for the securement of said excitation device to said fixture.

11. The method of claim 10, wherein said fixture includes a blade attachment portion having a pusher plate and a set screw.

12. The method of claim 11, further comprising providing an opening in said attachment portion that extends radially into said body.

13. The method of claim 12, further comprising providing in said blade attachment portion capturing features configured to mate with a root of said blade.

14. The method of claim 13, further comprising rotating said set screw to cause said pusher plate to push said root of said blade into said capturing features.

15. A fixture usable to retain a blade in a fixed-free configuration for modal testing, comprising:

a generally spherical body having a blade retaining portion, one or more attachment portions, and a flat fixture locating portion; said blade retaining portion comprising a set screw and a pusher plate; each of said one or more attachment portions having a flat surface and an opening extending away from said flat surface;

wherein, each of said one or more attachment portions is configured for the attachment of an excitation device.

16. The fixture of claim 15, wherein said blade retaining portion is configured to retain said blade such that no portion of said blade above a platform thereof contacts said fixture during said modal testing.

17. The fixture of claim 15, wherein said flat fixture locating portion is generally perpendicular to each of said one or more attachment portions.

18. The fixture of claim 15, wherein said blade retaining portion includes a capturing feature configured to capture a portion of said blade.

19. The fixture of claim 15, further comprising a stop.

20. The fixture of claim 19, wherein said stop is part of said pusher plate.

* * * * *